United States Patent [19]

Hirano

[11] Patent Number: 5,894,304
[45] Date of Patent: Apr. 13, 1999

[54] PEN INPUT APPARATUS AND PEN INPUT METHOD FOR DETECTING APPROACH OF PEN TO DISPLAY INTEGRATED TABLET BY CONTROLLING LIGHTING OF BACK LIGHT

[75] Inventor: Katsumi Hirano, Nara, Japan

[73] Assignee: Sharp Kabushiki Kaisha, Osaka, Japan

[21] Appl. No.: 08/842,792

[22] Filed: Apr. 16, 1997

[30] Foreign Application Priority Data

Apr. 16, 1996 [JP] Japan ................... 8-094192

[51] Int. Cl.$^6$ .................. G08C 21/00; G09G 3/36; G09G 5/00
[52] U.S. Cl. .................. 345/179; 345/87; 345/102; 345/104; 345/183; 178/18.1; 178/18.11
[58] Field of Search .................. 345/87, 102, 104, 345/173, 179, 182, 183; 178/18.1, 18.11

[56] References Cited

U.S. PATENT DOCUMENTS

| | | | |
|---|---|---|---|
| 4,958,915 | 9/1990 | Okada et al. | 345/102 |
| 5,065,357 | 11/1991 | Shiraishi | 345/102 |
| 5,078,476 | 1/1992 | Shin | 345/102 |
| 5,247,286 | 9/1993 | Ishikawa | 345/102 |
| 5,410,329 | 4/1995 | Tagawa | 345/104 |
| 5,589,848 | 12/1996 | Shimizu | 345/102 |

FOREIGN PATENT DOCUMENTS

| | | |
|---|---|---|
| A-5265650 | 10/1993 | Japan. |
| A-7129320 | 5/1995 | Japan. |
| A-7295743 | 11/1995 | Japan. |
| A-7295746 | 11/1995 | Japan. |
| A-7319603 | 12/1995 | Japan. |

*Primary Examiner*—Vijay Shankar

[57] ABSTRACT

A pen input apparatus includes an inversion signal generation circuit for generating an inversion signal to invert the direction of applied voltage to liquid crystal of a liquid crystal panel. There is a first conversion circuit to detect a voltage induced at a detection pen according to the inversion signal generated by the inversion signal generation circuit for converting the induced voltage into a direct-current voltage. A comparator circuit is included for comparing a voltage value of the direct-current voltage converted by the first conversion circuit with a predetermined value to determine whether the detection pen is close to the liquid crystal panel. A detection period signal generation circuit is used for turning on a back light of the liquid crystal panel when the first conversion circuit is not detecting an induced voltage, and for turning off the back light when the first conversion circuit is detecting an induced voltage.

8 Claims, 9 Drawing Sheets

1

PEN INPUT APPARATUS AND PEN INPUT METHOD FOR DETECTING APPROACH OF PEN TO DISPLAY INTEGRATED TABLET BY CONTROLLING LIGHTING OF BACK LIGHT

BACKGROUND OF THE INVENTION

1. Field of the Invention

The present invention relates to a pen input apparatus and a pen input method used in input for a personal computer, a word processor, and the like. More particularly, the present invention relates to a pen input apparatus and a pen input method for entering hand written characters and graphic symbols on a tablet provided at the display screen of a display.

2. Description of the Background Art

Referring to FIG. 1, a conventional pen input apparatus includes a liquid crystal panel 101, a back light 102, a detection pen 103, an amplifier 104 for amplifying induced voltage generated at detection pen 103, an inversion signal generation circuit 105 for generating a signal to invert the apply direction of a voltage applied to liquid crystal panel 101, a gate signal generation circuit 107 for generating first and second gate signals in synchronization with the inversion signal, a full-wave rectifier circuit 108 including a diode bridge and the like, a first processing circuit 109 for entering and integrating a signal from full-wave rectifier circuit 108 according to the first gate signal, a second processing circuit for entering and integrating a signal from full-wave rectifier circuit 108 according to the second gate signal, and a comparator circuit 114. First processing circuit 109 includes an analog gate circuit 109a and an integration circuit 109b. Second processing circuit 110 includes an analog gate circuit 110a and an integration circuit 110b.

For the purpose of preventing degradation of the liquid crystal of liquid crystal panel 101 due to electrolysis, the apply direction of the voltage applied to the liquid crystal is inverted periodically according to the level of the inversion signal generated by inversion signal generation circuit 105. At this inversion, the voltage of the drive signals applied to the electrodes of liquid crystal panel 101 are all altered. If detection pen 103 is in the proximity of the surface of liquid crystal panel 101 when the apply direction of the voltage to the electrode of liquid crystal panel 101 is inverted, a spike voltage is induced depending upon the distance between the leading electrode of detection pen 103 and the electrode of liquid crystal panel 101.

Determination can be made that detection pen 103 is in the proximity of liquid crystal panel 101 when the spike induced voltage is greater than a predetermined level. Also, determination can be made that detection pen 103 is remote from liquid crystal panel 101 when the spike induced voltage is below a predetermined level.

FIG. 2 shows in detail first and second processing circuits 109 and 110, and comparator circuit 114 of FIG. 1. First analog gate circuit 109a is formed of a FET (Field Effect Transistor) and the like that is turned on and off when a first gate signal g1 generated by gate signal generation circuit 107 attains a high level and a low level, respectively. Similarly, second analog gate circuit 110a is formed of a FET and the like that is turned on and off when a second gate signal g2 generated by gate signal generation circuit 107 attains a high level and a low level, respectively.

Integration circuit 109b includes an operational amplifier 115, a capacitor C1, and a resistor R1. Integration circuit 110b includes an operational amplifier 116, a capacitor C2, and a resistor R2. An integration circuit superior in the S/N ratio can be obtained by setting an appropriate value for the time constant by capacitor C1 and resistor R1, or by capacitor C2 and resistor R2. Comparator circuit 114 includes an operational amplifier 117 to compare the levels of the output voltages of integration circuits 109b and 110b, whereby a detection mode signal pm1 is output attaining a high level when the output of integration circuit 109b has a higher voltage level and a low level when the output of integration circuit 109b has a lower voltage level.

FIGS. 3(A)–(O) is the timing chart of various signals of each component of the pen input apparatus of FIG. 1. Inversion signal generation circuit 105 provides an inversion signal as for inverting the apply direction of the voltage to the electrode of liquid crystal panel 101 to liquid crystal panel 101 and gate signal generation circuit 107. Gate signal generation circuit 107 generates and outputs first and second gate signals g1 and g2 in synchronization with the entered inversion signal as.

Amplifier 104 amplifies the spike induced voltage generated by inversion of the direction of the applied voltage to liquid crystal panel 101 when detection pen 103 is in the proximity of liquid crystal panel 101. The amplified voltage is output as a signal sk. Full-wave rectifier circuit 108 rectifies signal sk and outputs the rectified signal.

First analog gate circuit 109a samples an output signal of full-wave rectifier circuit 108 by first gate signal g1 to output a signal sp1. More specifically, first analog gate circuit 109a is turned on when first gate signal g1 attains a high level, whereby a signal from full-wave rectifier circuit 108 is output. When first gate signal g1 attains a low level, first analog gate circuit 109a is turned off. Similarly, second analog gate circuit 110a samples an output signal of full-wave rectifier circuit 108 according to second gate signal g2 to output a signal sp2.

Integration circuit 109b integrates signal sp1 to output a direct-current voltage dv1. Similarly, integration circuit 110b integrates signal sp2 to output a direct-current voltage dv2. Comparator circuit 114 compares direct-current voltages dv1 and dv2 to provide a detection mode signal pm1 of a high level and a low level when voltage dv1 has a higher and lower level, respectively, than voltage dv2.

However, a noise signal ns that is generated periodically is sampled by analog gate circuit 110a (signal sp4), whereby the voltage level of signal dv4 integrated by integration circuit 110b is increased. There is a possibility that output voltage dv3 from integration circuit 109b does not become higher than output voltage dv4 from integration circuit 110b so that detection mode signal pm2 output from comparator circuit 114 remains at the low level even though detection pen 103 is in the proximity of liquid crystal panel 101. There is a problem that approach of detection pen 103 to liquid crystal panel 101 cannot be properly detected.

Japanese Patent Laying-Open No. 5-265650 discloses a display integrated type tablet apparatus that prevents erroneous detection of the coordinates from the detection pen due to noise by detecting only induced voltage that is generated in response to inversion of the direction of the applied voltage to the liquid crystal when the detection pen approaches the liquid crystal panel.

FIG. 4 is a block diagram showing a structure of this display integrated type tablet apparatus. The display integrated type tablet apparatus includes a detection pen 208, an operational amplifier 209 connected to a leading electrode of detection pen 208, an analog gate AGt for coordinate-detection. analog gates $AG_1$ and $AG_2$ for detecting induced voltage. an x-coordinate detection circuit 210 for detecting the x-coordinate, a y-coordinate detection circuit 211 for detecting the y-coordinate, a first processing circuit 223 for rectifying an induced voltage signal sampled by first analog gate $AG_1$ to obtain an average voltage, a second processing circuit 224 for rectifying an induced voltage signal sampled by second analog gate $AG_2$ to obtain an average voltage, a first comparator 225 for comparing an average voltage obtained by first processing circuit 223 with a reference value, a second comparator 226 for comparing an average voltage obtained by second processing circuit 224 with a reference value, an AND gate 227, and a coordinate output sorting circuit 228 for discriminating and providing the x-coordinate and the y-coordinate.

The operation of the display integrated type tablet apparatus of FIG. 4 will be described hereinafter while appropriately referring to the timing chart of FIG. 5. An inversion signal for inverting the direction of the applied voltage to the liquid crystal is generated from a clock signal cplo. Gate signal $g_1$ provides a pulse of a width $tg_1$ at the transition of inversion signal fro. Gate signal $g_2$ attains a low level when gate signal $g_1$ is high, and is driven to a high level at an elapse of a time td from the fall of gate signal $g_1$.

A spike induced voltage signal $E_1$ indicates the induced voltage generated by inversion of the direction of the applied voltage to the liquid crystal when detection pen 208 is in the proximity of the liquid crystal panel. Spike induced voltage signal $E_1$ of one frame period sampled by first analog gate $AG_1$ is rectified by first processing circuit 223 (signal $E_1g_1$) and integrated. First comparator 225 provides a signal of a high level when this integrated voltage value is greater than a reference value.

An induced voltage signal arising from the noise of one frame period sampled by second analog gate $AG_2$ is rectified by second processing circuit 224 and integrated. Second comparator 226 provides a signal of a high level when this integrated voltage value is smaller than a reference value.

AND gate 227 provides a mode signal of a high level only when the tip of detection pen 208 is close to the liquid crystal panel and the noise is small. Determination is made whether detection of the coordinates is carried out according to this mode signal.

When the noise becomes so great that the integrated voltage value of the induced voltage signal arising from the noise becomes greater than the reference value compared in second comparator 226, there is a problem that detection of the coordinates cannot be carried out.

SUMMARY OF THE INVENTION

An object of the present invention is to provide a pen input apparatus that can suppress generation of noise to properly detect approach of a detection pen to a liquid crystal panel.

Another object of the present invention is to provide a pen input method that can suppress generation of noise to properly detect approach of a detection pen to a liquid crystal panel.

According to an aspect of the present invention, a pen input apparatus includes an inversion signal generation circuit for generating an inversion signal to invert the apply direction of a voltage applied to the liquid crystal of a liquid crystal panel, a first conversion circuit for detecting a voltage induced by the detection pen to convert the induced voltage into a direct-current voltage according to an inversion signal generated by the inversion signal generation circuit, a comparator circuit for comparing the voltage value converted by the first conversion circuit with a predetermined value to determine whether the detection pen is close to the liquid crystal panel, and a detection period signal generation circuit for turning on a back light of the liquid crystal panel when the first conversion circuit is not detecting an induced voltage, and for turning off the back light when the first conversion circuit is detecting an induced voltage.

Since the detection period signal generation circuit turns off the back light when the first conversion circuit is detecting an induced voltage, the induced voltage between the liquid crystal panel and the detection pen detected by the first conversion circuit is not subjected to induction caused by noise from the back light. Therefore, the pen input apparatus can properly detect that the detection pen is in the proximity of the liquid crystal panel.

According to another aspect of the present invention, a pen input apparatus includes an inversion signal generation circuit for generating an inversion signal that inverts the apply direction of a voltage applied to liquid crystal of a liquid crystal panel, a gate signal generation circuit for generating a first gate circuit in synchronization with the inversion signal generated by the inversion signal generation circuit, a first conversion circuit for detecting a voltage induced by the detection pen according to the first gate signal generated by the gate signal generation circuit to convert the induced voltage into a direct-current voltage, a comparator circuit for comparing the value of the direct-current voltage converted by the first conversion circuit with a predetermined value to generate a detection mode signal of the coordinates, and a detection period signal generation circuit for generating a coordinate detection period signal that turns on a back light of the liquid crystal panel when the first conversion circuit is not detecting an induced voltage by the first gate signal, and turning off the back light when the first conversion circuit is detecting an induced voltage.

Since the detection period signal generation circuit turns off the back light when the first conversion circuit is detecting an induced voltage, the induced voltage between the liquid crystal panel and the detection pen currently detected by the first conversion circuit is not subjected to induction by the noise from the back light. Therefore, the pen input apparatus can properly detect that the detection pen is in the proximity of liquid crystal panel.

According to a further aspect of the present invention, a pen input method includes the steps of generating an inversion signal to invert an apply direction of a voltage applied to liquid crystal of a liquid crystal panel, detecting a first induced voltage induced at the detection pen according to the inversion signal, comparing the value of the detected first induced voltage with a predetermined value to determine whether the detection pen is close to the liquid crystal panel, turning on a back light of the liquid crystal panel when the first induced voltage is not being detected, and turning off the back light when the first induced voltage is being detected.

Since the back light is turned off when an induced voltage between the liquid crystal panel and the detection pen is being detected, the currently detected induced voltage is not subjected to induction caused by the noise from the back light. According to this pen input method, proper detection can be made that the detection pen is in the proximity of the liquid crystal panel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 6:
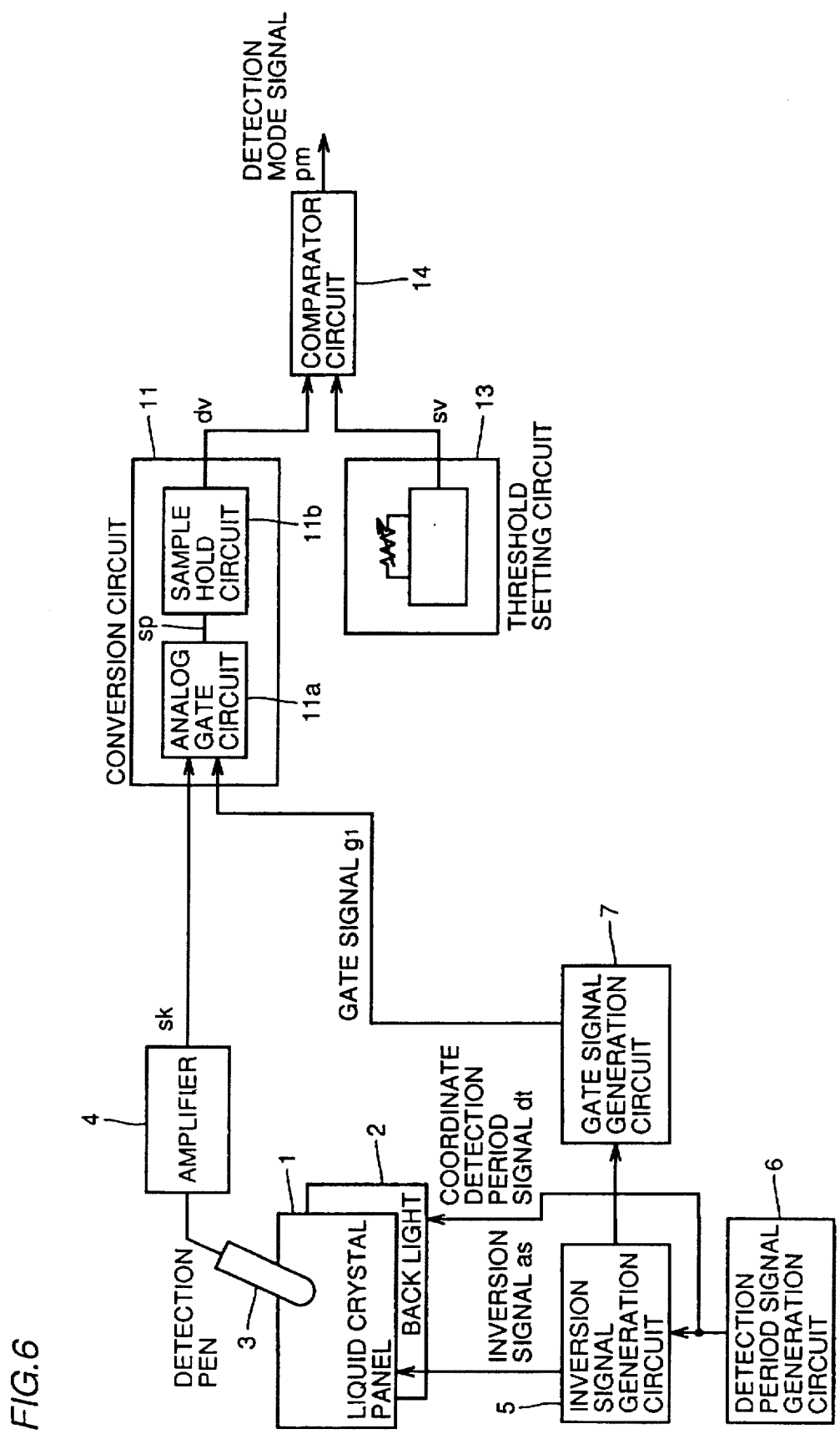
FIG. 6 is a block diagram showing a structure of a pen input apparatus according to first and second embodiments of the present invention.

Referring to FIG. 6, a pen input apparatus according to a first embodiment of the present invention includes a liquid crystal panel 1, a back light 2, a detection pen 3, an amplifier 4 connected to a leading electrode of detection pen 3, an inversion signal generation circuit 5 for providing an inversion signal ak to invert the direction of the applied voltage to the liquid crystal of liquid crystal panel 1, a detection period signal generation circuit 6 for generating a signal indicating the detection period of coordinates by detection pen 3, a gate signal generation circuit 7 for generating a gate signal $g_1$ in synchronization with inversion signal ak during the detection period of coordinates, a conversion circuit 11 for sampling signal sk from amplifier 4 according to gate signal g1 to convert the sampled signal into a direct-current voltage, a threshold setting circuit 13 for setting a threshold value, and a comparator circuit 14 for comparing an output from conversion circuit 11 with an output from threshold setting circuit 13.

Conversion circuit 11 includes an analog gate circuit 11a that is turned on and off when gate signal $g_1$ attains a high level and a low level, respectively, and a sample hold circuit 11b for maintaining the voltage level when output signal sp from analog gate circuit 11a is increased, and that attains a high impedance state at an elapse of a predetermined time period. Threshold setting circuit 13 provides a threshold voltage according to voltage-division by a resistor. The threshold voltage is output only when detection period signal dt attains a high level.

The operation of the pen input apparatus of the present embodiment will be described hereinafter with reference to the timing chart of FIGS. 7(A)–(H). Detection period signal generation circuit 6 generates a signal dt indicating the detection period of coordinates on liquid crystal panel 1 when detection pen 3 is in the proximity of liquid crystal panel 1, and provides signal dt to back light 2 and inversion signal generation circuit 5. Detection period signal dt of a high level implies that detection of coordinates is currently provided.

Inversion signal generation circuit 5 provides a pulse to inversion signal ak for inverting the direction of the applied voltage to the liquid crystal of liquid crystal panel 1. As shown in FIG. 7(B), one pulse is provided in response to detection of a rise of detection period signal dt.

Gate signal generation circuit 7 generates gate signal $g_1$ in synchronization with the pulse of inversion signal ak when detection period signal dt attains a high level. Amplifier 4 amplifies a spike induced voltage generated by inversion of the direction of the applied voltage to liquid crystal panel 1 when detection pen 3 is in the proximity of liquid crystal panel 1, and provides the amplified voltage as signal sk.

Analog gate circuit 11a is turned on when gate signal $g_1$ attains a high level to provide signal sp.

Sample hold circuit 11b detects and holds the voltage level of signal sp, and provides a direct-current voltage dv. Sample hold circuit 11b attains a high impedance state at an elapse of a predetermined time period.

Threshold setting circuit 13 provides a predetermined voltage sv during the high level period of detection period signal dt. Comparator circuit 14 compares direct-current voltage dv output from sample hold circuit 11b with a threshold voltage sv output from threshold setting circuit 13 to provide a detection mode signal pm of a high level when direct-current voltage dv is higher than threshold voltage sv, and of a low level when direct-current voltage dv is not higher than threshold voltage sv, respectively. More specifically, detection mode signal pm of a high level is output when detection pen 3 is close enough to liquid crystal panel 1. Detection mode signal pm of a low level is output when detection pen 3 is away from liquid crystal panel 1. The proper coordinates of detection pen 3 on liquid crystal panel 1 can be detected by rendering the coordinate detection valid and invalid when detection mode signal pm attains a high level and a low level, respectively.

Back light 2 is supplied with coordinate detection period signal dt generated by detection period signal generation circuit 6 to be turned on and off when coordinate detection period signal dt attains a low level and a high level, respectively. Since back light 2 is turned off during detection of the coordinates by detection pen 3, the induced voltage arising from the noise from back light 2 is not induced at the leading electrode of detection pen 3 to suppress erroneous detection of coordinates caused by noise.

According to the pen input apparatus of the present embodiment, noise from back light 2 does not affect detection pen 3 during coordinate detection, so that proper coordinate detection is allowed. Furthermore, the cost can be reduced since noise measures for back light 2 is no longer required.

A pen input apparatus according to a second embodiment of the present invention will be described hereinafter. The structure of the pen input apparatus of the present embodiment is similar to that of the first embodiment shown in FIG. 6. Therefore, the details will not be repeated.

Figure 7:
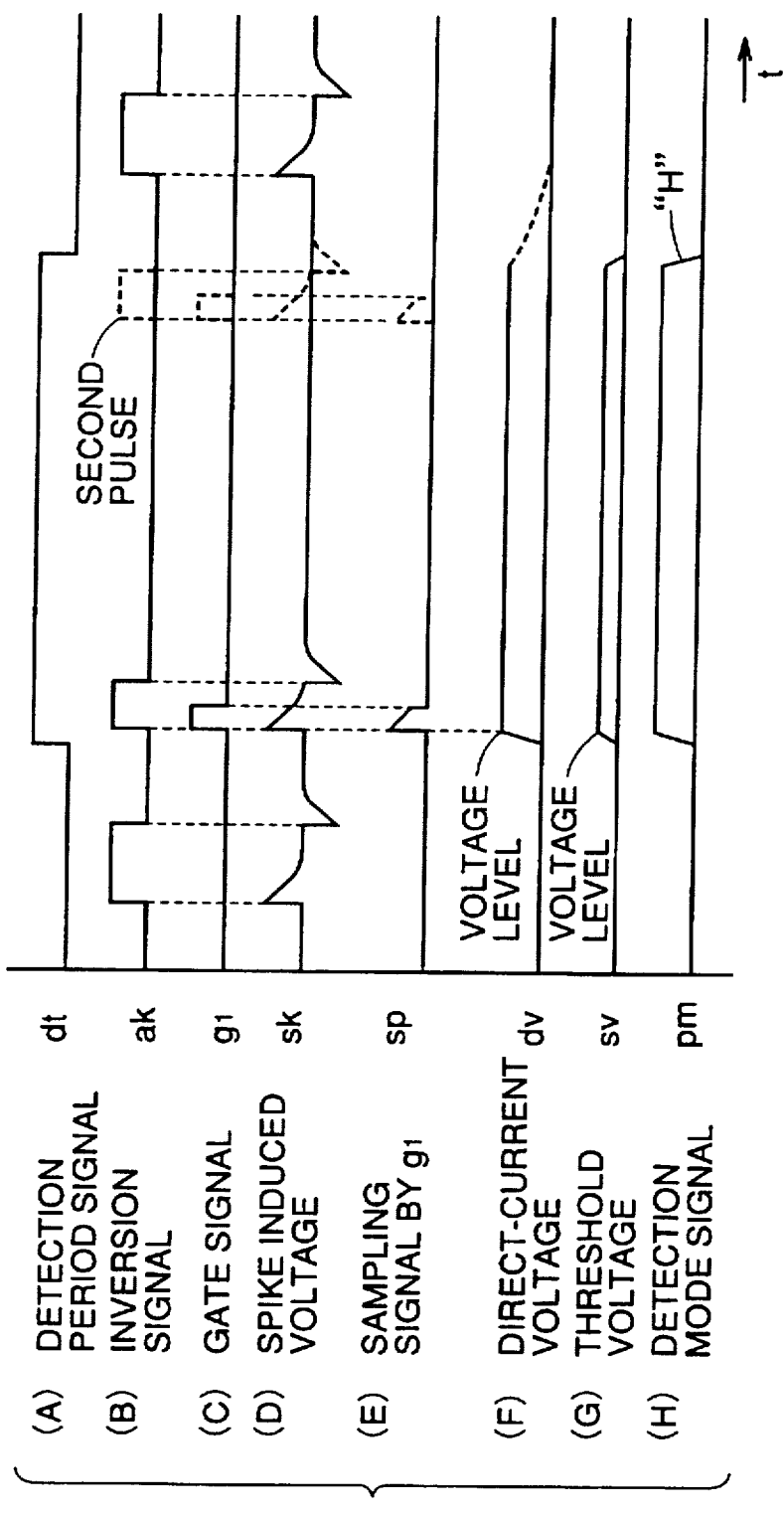
FIGS. 7(A)–(H) is a timing chart of various signals of each component of the pen input apparatus of the first and second embodiments.

The pen input apparatus of the second embodiment differs from the pen input apparatus of the first embodiment only in the function of inversion signal generation circuit 5. In the second embodiment, a pulse is provided two times in inversion signal ak during the high level period of detection period signal dt. In FIG. 7, the second pulse of inversion signal ak is indicated by a broken line.

In response to the second pulse of inversion signal ak, gate signal generation circuit 7 provides a second pulse in gate signal 91 as indicated in FIG. 7(C). The operation of the pen input apparatus here is identical to the operation described in the first embodiment. By detecting two spike induced voltages sk during the coordinate detection period, the influence caused by noise can be reduced. More specifically, when only one of the two detected induced voltages indicates a level higher than the threshold value, determination is made that it has been caused by noise. Determination is made that detection pen 3 is in the proximity of liquid crystal panel 1 only when the two detected induced voltages both indicate a level higher than the threshold value.

According to the pen input apparatus of the second embodiment, a more proper coordinate detection than the pen input apparatus of the first embodiment can be effected, in addition to the advantages already described in the first embodiment.

Figure 1:
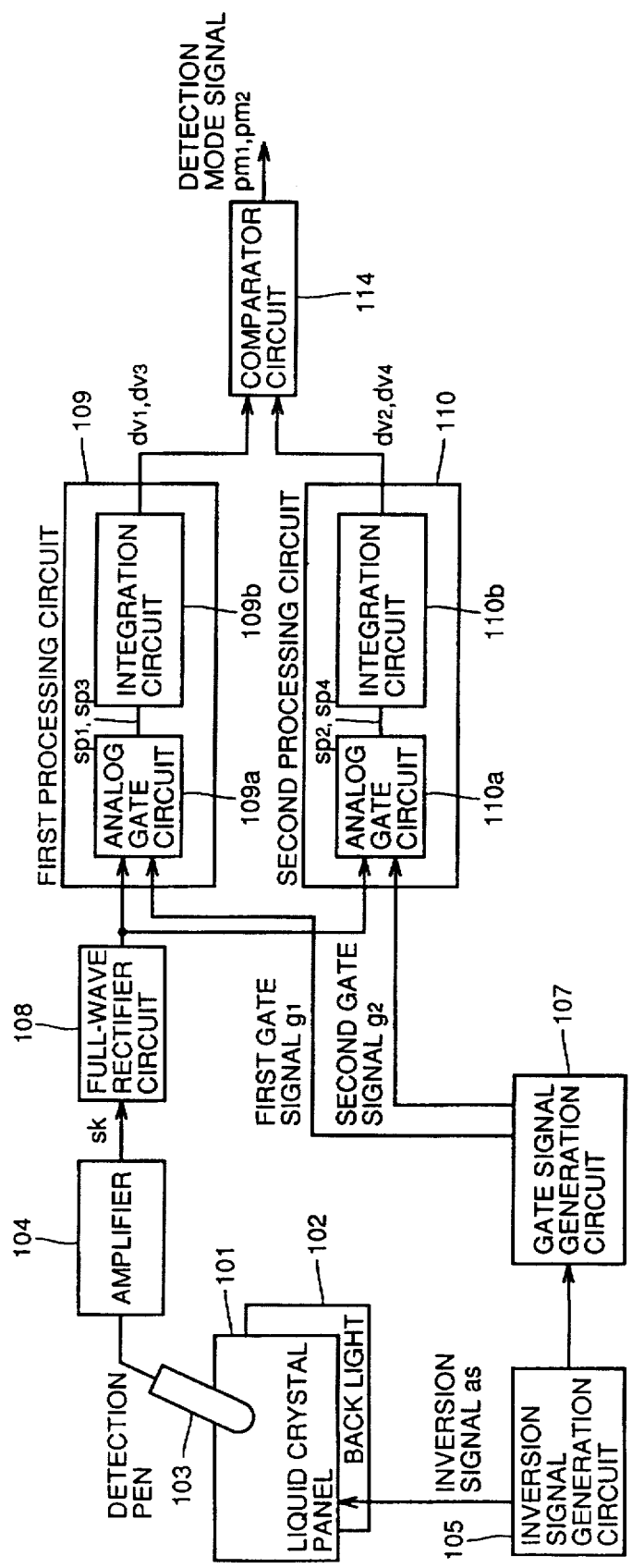
FIG. 1 is a block diagram showing an example of the circuit configuration of a conventional pen input apparatus.
Figure 2:
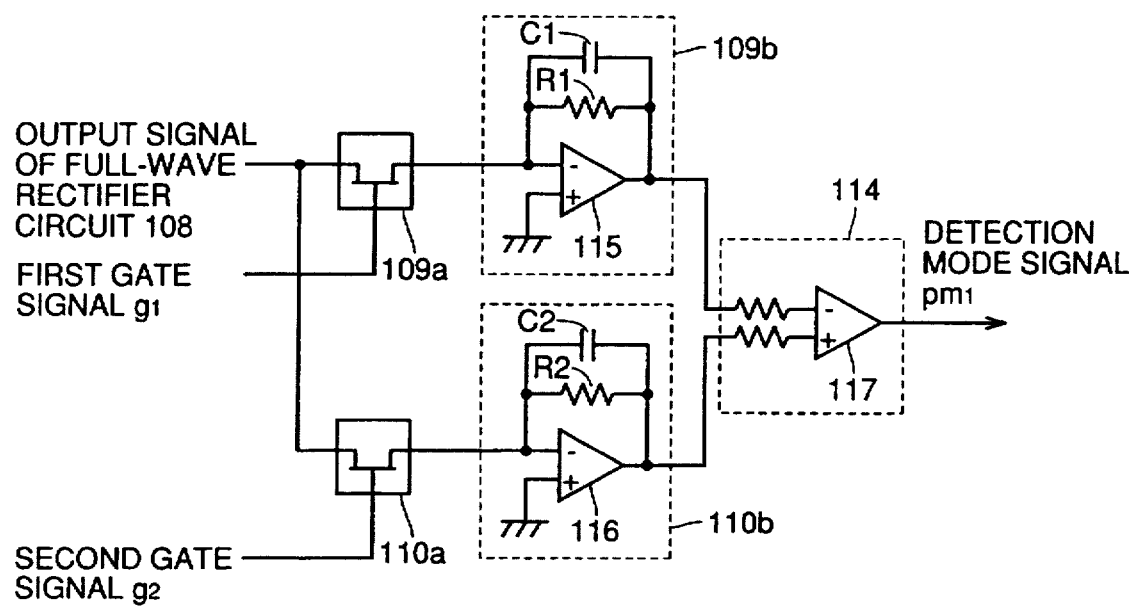
FIG. 2 shows the details of first and second processing circuits 109 and 110, and a comparator circuit 114 of FIG. 1.
Figure 3:
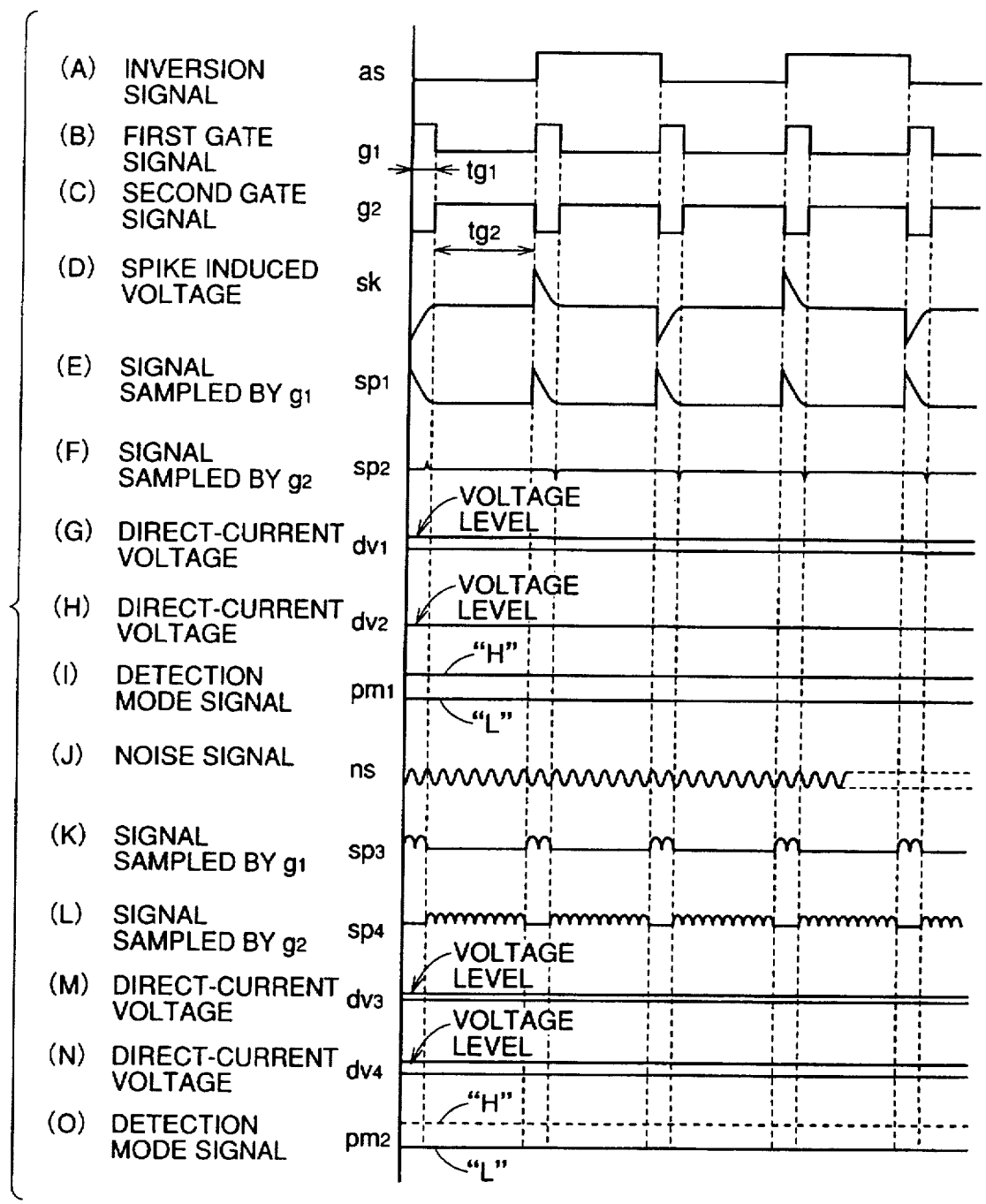
FIGS. 3(A)–(O) is a timing chart of various signals of each component in the pen input apparatus of FIG. 1.
Figure 4:
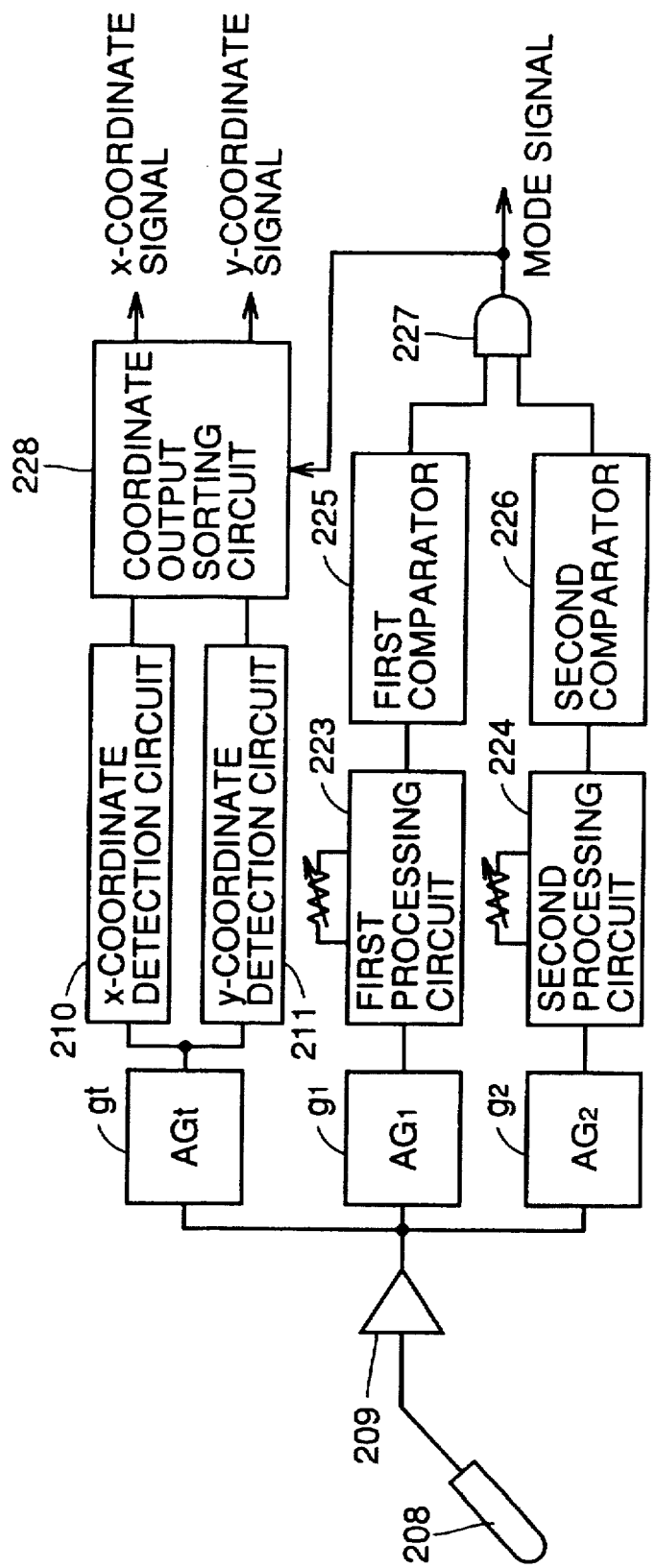
FIG. 4 is a block diagram showing an example of the circuit configuration of a conventional display integrated type tablet apparatus.
Figure 5:
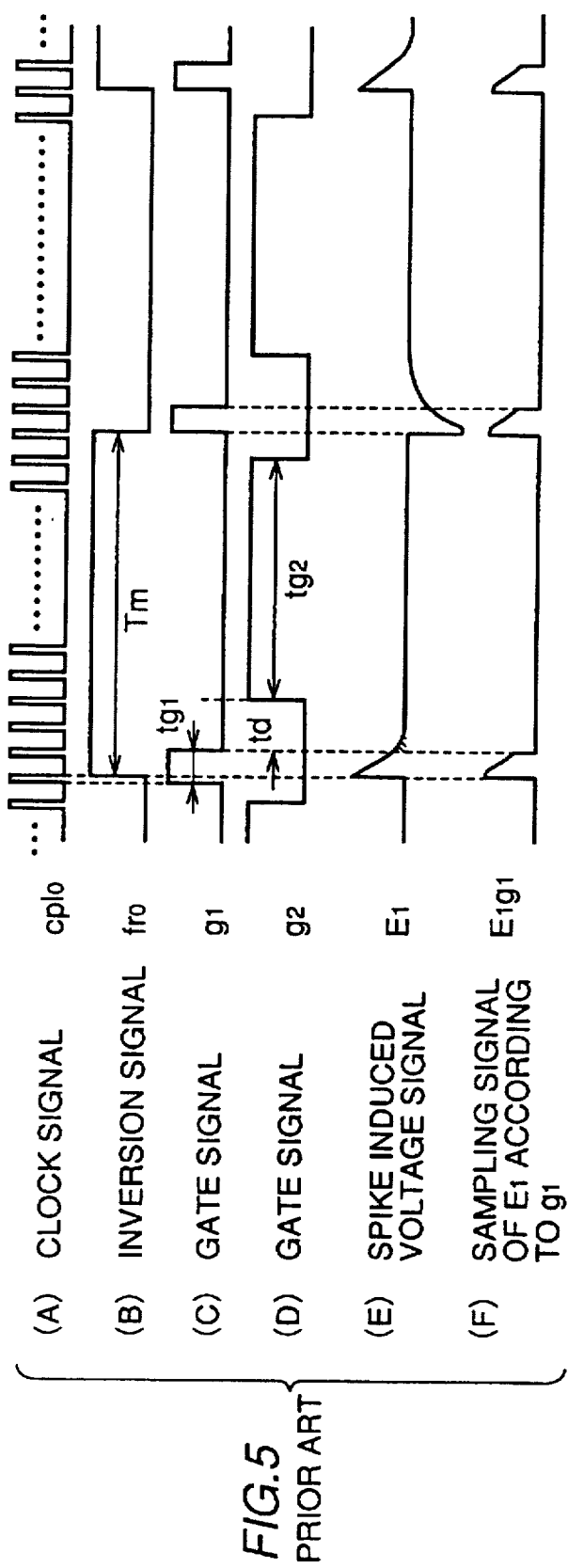
FIGS. 5(A)–(F) is a timing chart of various signals of each component of the display integrated type tablet apparatus of FIG. 4.
Figure 8:
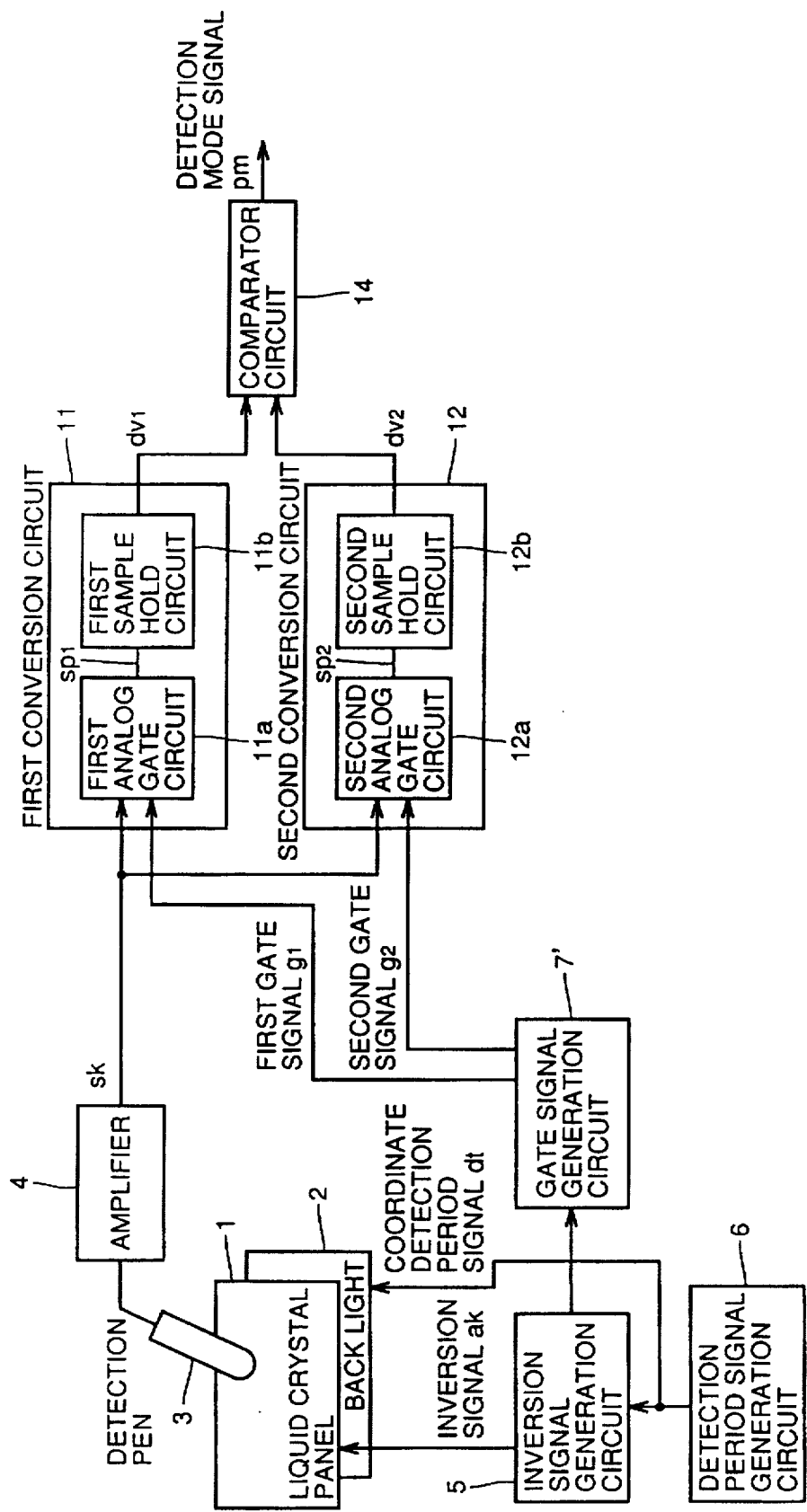
FIG. 8 is a block diagram showing a structure of a pen input apparatus according to a third embodiment of the present invention.
Figure 9:
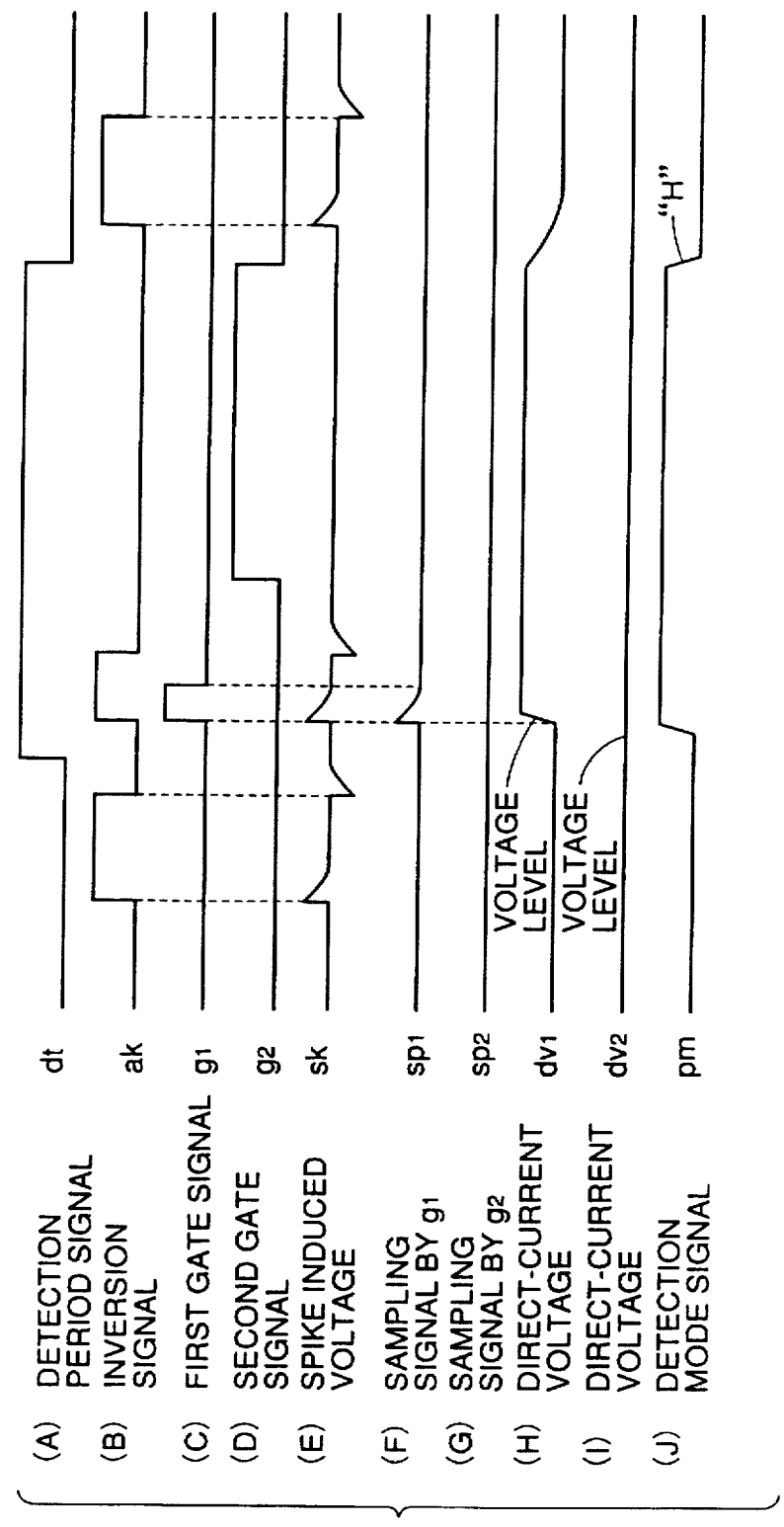
FIGS. 9(A)–(J) is a timing chart of various signals of each component of the pen input apparatus according to the third embodiment of the present invention.

A pen input apparatus according to a third embodiment of the present invention will be described hereinafter with reference to FIG. 8. The structure of the pen input apparatus of the third embodiment differs from the structure of the pen input apparatus of the first embodiment shown in FIG. 5 only in that threshold setting circuit 13 is substituted with a second conversion circuit 12, and that a gate signal generation circuit 7' outputs first and second gate signals $g_1$ and $g_2$ applied to first and second conversion circuits 11 and 12, respectively. Therefore, detailed description of likewise components will not be repeated.

The operation of the pen input apparatus of the third embodiment will be described hereinafter while appropriately referring to the timing chart of FIGS. 9(A)-(J). Gate signal generation circuit 7' provides a pulse in first and second gate signals $g_1$ and $g_2$ in synchronization with the pulse of inversion signal ak when detection period signal dt attains a high level. As shown in (C) and (D) in FIG. 9, respective pulses are output so that the high levels of the first and second gate signals $g_1$ and $g_2$ do not overlap each other.

Second analog gate circuit 12a in second conversion circuit 12 is turned on when second gate signal $g_2$ attains a high level. More specifically, second analog gate 12a is turned off when a positive spike induced voltage is generated caused by inversion of the direction of applied voltage to liquid crystal panel 1 when detection pen 3 is in the proximity of liquid crystal panel 1. Second analog gate 12a is turned on when that positive induced voltage is not generated.

When first conversion circuit 11 is not detecting an induced voltage, second conversion circuit 12 is detecting an induced voltage that is generated by continuous extraneous noise. When that voltage level dv2 becomes higher than voltage level dv1 output from first conversion circuit 11, comparator circuit 14 provides a detection mode signal pm of a low level. Reliability of coordinate detection is improved by inhibiting coordinate detection when extraneous noise other than the noise from back light 2 is generated.

According to the pen input apparatus of the third embodiment, erroneous detection of coordinates caused by extraneous noise other than the noise from the back light can be prevented, in addition to the advantages described in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pen input apparatus comprising:
   generation means for generating an inversion signal to invert an apply direction of a voltage applied to liquid crystal of a liquid crystal panel,
   first conversion means for detecting a voltage induced at a detection pen and converting the induced voltage into a direct-current voltage according to the inversion signal generated by said generation means,
   determination means to compare a value of the direct-current voltage converted by said first conversion means with a predetermined value for determining whether said detection pen is close to said liquid crystal panel, and
   means for controlling for turning on a back light of said liquid crystal panel when said first conversion means is not detecting an induced voltage, and for turning off said back light when said first conversion means is detecting an induced voltage.

2. The pen input apparatus according to claim 1, wherein said generation means provides at least two pulses of said inversion signal while said back light is turned off by said control means, and
   said determination means compares voltage values of at least two direct-current voltages converted by said first conversion means according to said at least 2 pulses with said predetermined value for determining whether said detection pen is close to said liquid crystal panel.

3. The pen input apparatus according to claim 1, further comprising second conversion means to detect an induced voltage at said detection pen for converting the induced voltage into a direct-current voltage during a period when said first conversion means is not detecting a voltage induced by said detection pen,
   wherein said determination means compares a voltage value of the direct-current voltage converted by said first conversion means with a voltage value of the direct-current voltage converted by said second conversion means to determine whether said detection pen is close to said liquid crystal panel.

4. A pen input apparatus comprising:
   an inversion signal generation circuit for generating an inversion signal to invert an apply direction of a voltage applied to liquid crystal of a liquid crystal panel,
   a gate signal generation circuit for generating a first gate signal in synchronization with the inversion signal generated by said inversion signal generation circuit,
   a first conversion circuit to detect a voltage induced at a detection pen by the first gate signal generated by said gate signal generation circuit for converting the induced voltage into a direct-current voltage,
   a comparator circuit for comparing a voltage value of the direct-current voltage converted by said first conversion circuit with a predetermined value to generate a detection mode signal of coordinates, and
   a detection period signal generation circuit for generating a coordinate detection period signal to turn on a back light of said liquid crystal panel when said first conversion circuit is not detecting an induced voltage by the first gate signal, and to turn off said back light when said first conversion circuit is detecting an induced voltage by the first gate signal.

9

5. The pen input apparatus according to claim 4, wherein said inversion signal generation circuit provides at least two pulses of said inversion signal while said back light is turned off by said detection period signal generation circuit, and said comparator circuit compares voltage values of at least two direct-current voltages output from said first conversion circuit by said at least two pulses with said predetermined value to generate a detection mode signal of coordinates.

6. The pen input apparatus according to claim 4, further comprising a second conversion circuit to detect a voltage induced at a detection pen by a second gate signal for converting the induced voltage into a direct-current voltage, wherein said gate signal generation circuit generates a first gate signal in synchronization with the inversion signal generated by said inversion signal generation circuit, and said second gate signal which is an inverted version of said first gate signal, wherein said comparator circuit compares a voltage value of the direct-current voltage converted by said first conversion circuit with a voltage value of the direct-current voltage converted by said second conversion circuit to generate a detection mode signal of coordinates.

10

7. A pen input method comprising the steps of:

generating an inversion signal to invert an apply direction of a voltage applied to liquid crystal of a liquid crystal panel, detecting a first induced voltage induced at a detection pen according to said inversion signal, determining whether said detection pen is close to said liquid crystal panel by comparing a voltage value of said detected first induced voltage with a predetermined value, and turning on a back light of said liquid crystal panel when said first induced voltage is not being detected, and turning off said back light when said first induced voltage is being detected.

8. The pen input method according to claim 7, further comprising the step of detecting a second voltage induced at said detection pen while said first induced voltage is not being detected, wherein said step of determination compares a voltage value of said detected first induced voltage with a voltage value of said second induced voltage for determining whether said detection pen is close to said liquid crystal panel.

* * * * *